(12) United States Patent
Niccum et al.

(10) Patent No.: US 8,192,614 B2
(45) Date of Patent: Jun. 5, 2012

(54) SELF-STRIPPING FCC RISER CYCLONE

(75) Inventors: Phillip Kent Niccum, Houston, TX (US); Iwan Hirsan Chan, Houston, TX (US); Richard Brian Miller, Katy, TX (US); Steven Arthur Tragesser, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 1776 days.

(21) Appl. No.: 10/711,308

(22) Filed: Sep. 9, 2004

(65) Prior Publication Data

US 2006/0049082 A1    Mar. 9, 2006

(51) Int. Cl.
*C10G 11/00* (2006.01)
*F27B 15/08* (2006.01)
*F27B 15/09* (2006.01)

(52) U.S. Cl. ......... 208/113; 208/150; 422/144; 422/145

(58) Field of Classification Search .................. 208/113, 208/150, 161; 422/139, 144, 145, 147
See application file for complete search history.

(56) References Cited

U.S. PATENT DOCUMENTS

| | | | |
|---|---|---|---|
| 3,802,570 A | 4/1974 | Dehne | 210/304 |
| 4,455,220 A | 6/1984 | Parker et al. | 208/161 |
| 4,502,947 A | 3/1985 | Haddad et al. | 208/175 |
| 4,514,285 A * | 4/1985 | Niccum et al. | 208/161 |
| 4,664,889 A | 5/1987 | Steenge et al. | |
| 4,692,311 A * | 9/1987 | Parker et al. | 422/144 |
| 4,741,883 A | 5/1988 | Haddad et al. | 422/144 |
| 4,778,488 A | 10/1988 | Koers | 55/1 |
| 5,569,435 A | 10/1996 | Fusco et al. | 422/147 |
| 5,843,377 A * | 12/1998 | Fandel et al. | 422/144 |
| 5,869,008 A * | 2/1999 | Dewitz | 422/144 |
| 6,041,754 A * | 3/2000 | Mori et al. | 123/339.23 |
| 6,296,812 B1 | 10/2001 | Gauthier et al. | |
| 7,108,138 B2 * | 9/2006 | Simpson | 209/720 |
| 7,160,518 B2 | 1/2007 | Chen et al. | |
| 7,179,428 B2 | 2/2007 | Dries | |
| 2005/0016178 A1 * | 1/2005 | Wasif et al. | 60/752 |
| 2005/0183664 A1 * | 8/2005 | Hwang et al. | 118/715 |

OTHER PUBLICATIONS

N.W.M. Ko & A.S.K. Chan, In the Intermixing Region Behind Circular Cylinders With Stepwise Change of the Diameter, 9 Experiments in Fluids 213-221(1990).*

* cited by examiner

*Primary Examiner* — Randy Boyer
(74) *Attorney, Agent, or Firm* — KBR IP Legal Dept.

(57) ABSTRACT

Apparatus and method are provided for separating and stripping suspensions comprising catalyst particles transported in vapors from the fluid catalytic cracking riser/reactor. Particles are disentrained from vapor in a vortex zone 112 of the primary cyclonic separator 100. The disentrained particles enter a stripping zone 126, wherein the particles are contacted with a stripping gas 136 to recover vapors entrained and adsorbed onto the catalyst. The stripping gas 136 enters stripping zone 126 via perforations in the wall of the cyclone 100. The stripping gas 136 limits the residual catalytic conversion of hydrocarbon vapors and formation of delta-coke on the catalyst. Stripped catalyst is delivered from the cyclone stripping zone 126 via a dipleg 130 connected to a bottom of the cyclone 100, and enters an FCC stripping vessel. Solids-lean stripping gas and vapors from the catalyst particles are blended with the carrier fluid and discharged from the cyclone.

16 Claims, 11 Drawing Sheets

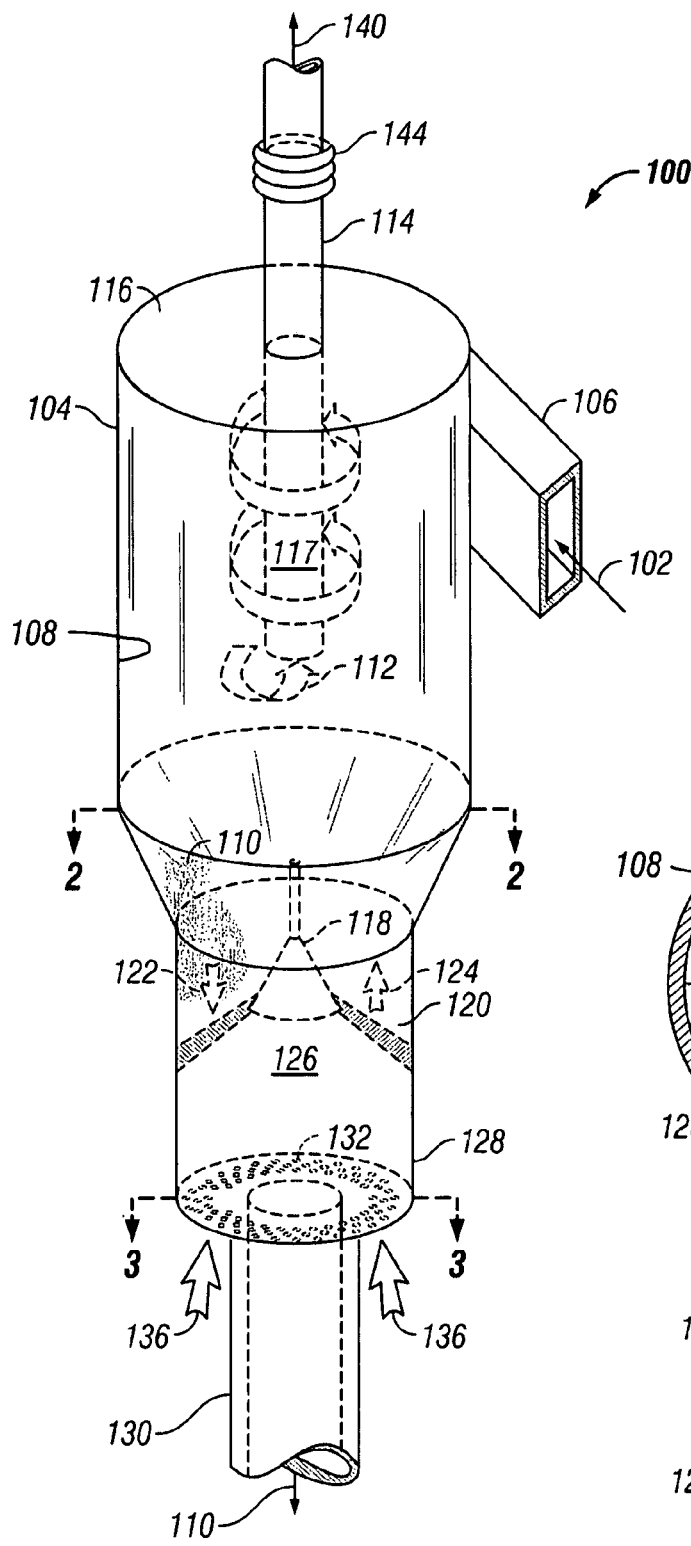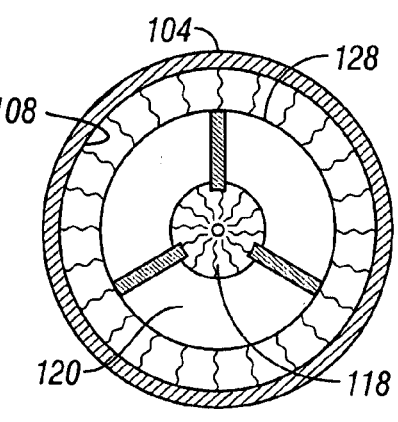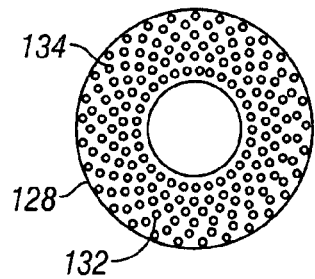
FIG. 1
FIG. 2
FIG. 3

SELF-STRIPPING FCC RISER CYCLONE

BACKGROUND

This invention relates to recovering particles from a fluid-particulate suspension in a cyclone separator, and subsequently stripping entrained fluid from the particles.

Cyclonic separation involves separating a mixture of two or more phases, such as for example, suspensions of particulates in a carrier fluid, under a centrifugal force generated by centripetal motion. A cyclone separator, or cyclone, is a mechanical device to perform centrifugal separation of flowing mixed phases. Uses of cyclonic separation methods can include unit operations to purify a phase, to concentrate a phase, to terminate chemical and physical interactions between mixed phases, or combinations thereof.

Cyclone separation is common in fluid catalytic cracking (FCC) technology where hydrocarbon vapors and particulate catalysts come into intimate contact. FCC processes, which employ catalyst fluidization and hydrocarbon atomization for conversion reactions, require rapid mixing and separation of fluid and solid phases to maintain control over product yields. Developments in cyclonic separation technology have driven FCC technology toward increased catalyst activities; conversely, increases in catalyst activity spur the need for development of higher cyclone efficiencies.

Achieving high productivity from FCC systems requires methods for the regulation of contact times between the catalyst and the hydrocarbons. Controlling the contact times depends increasingly on rapid cyclonic separation, as contact time is the key to optimizing process yields. FCC systems are designed to operate using typical interphase contact times between 0.2 and 10 seconds, desirably between 1 and 4 seconds.

In any cyclonic separation of a suspension, some residual carrier fluid will remain entrained with and adsorbed onto the particles, even after the particles have separated and settled out of the carrier fluid. Accordingly, because of high reaction rates in FCC applications, another important consideration of cyclonic separation is the displacement of the residual carrier fluid from the disentrained catalyst particles. This displacement will stop reactions between the catalyst and residual hydrocarbon fluids, helping to control conversion product profiles and to minimize "delta coking" on the catalyst.

One method of displacing residual fluid from disentrained catalyst particles includes the introduction of a stripping gas, such as for example, air, steam, ammonia, flue gas, or similar gases, to diffuse the residual hydrocarbons away from the disentrained catalyst particles.

U.S. Pat. No. 3,802,570 to Dehne discloses a cyclonic separation method to stabilize a vortex in a cyclone separator for improved phase separation through reduced re-entrainment of solids.

U.S. Pat. Nos. 4,455,220 and 4,692,311 to Parker et al. disclose injecting air and ammonia via utility piping into an annulus below the cyclone, and diffusing the gases through a sintered, annular, stainless steel ring into the catalyst bed beneath a vortex stabilizer in the cyclone. The gases are injected at a rate of about 1 to 4 grams of gas per kilogram of catalyst separated in the cyclone.

U.S. Pat. Nos. 4,502,947 and 4,741,883 to Haddad et al. disclose a method of closing a pathway of FCC-cracked hydrocarbon vapors wherein the catalyst suspended in the vapors exits the FCC riser-reactor and is conducted via an unsealed plenum through a succession of staged cyclone separators in series, wherein the cyclones are mounted in the FCC catalyst-stripping vessel. Stripping gas filling the stripping vessel blends with the suspension through an unsealed annular junction in the plenum, downstream of a first-stage riser cyclone.

U.S. Pat. No. 4,778,488 to Koers discloses a cyclone separator for removing hot particles of shale, tar sand, or coal from a gas-borne suspension in a pyrolytic retorting process. A pipe manifold is inserted into the bottom section of the cyclone for introducing stripping gas into the dense bed of separated solids.

U.S. Pat. No. 5,569,435 to Fusco et al. discloses an open-bottomed, diplegless, open-topped cyclone design for receiving a flow of suspended solids from the FCC riser. The design accommodates unsteady state FCC riser conditions, and is said to provide efficient separation of solids. Stripping gas is introduced into an upper section of an FCC catalyst-stripping vessel housing the cyclone. Up to 20 percent of the stripping gas enters the cyclone through the cyclone's open bottom, and the balance of the stripping gas enters an annular opening in the cyclone duct which discharges vapors from the top of the cyclone.

U.S. Pat. No. 5,869,008 to Dewitz discloses an open primary cyclone with the lower end of the cyclone inserted into the catalyst bed of the FCC stripping vessel enclosure. A piping manifold is installed within the open cyclone, beneath the surface of the cyclone's catalyst bed, for injecting stripping gas into the bed.

SUMMARY

The present invention is a self-stripping method and apparatus for particulate separation from a flowing suspension of the particulates in a fluid carrier stream. Stripping is integrated with cyclonic separation to diffuse residual carrier fluid away from particulates as the particulates are disentrained from the suspension. The invention does not require an external source of stripping material, thereby reducing the overall mechanical complexity of the device. The invention can be advantageously employed in a process or system for which the stripping can improve process productivity, selectivity, retention of solids, or the like. In particular, this invention is suited for service in fluid catalytic cracking (FCC) and like processes. The invention facilitates FCC by advancing and accelerating the stripping of hydrocarbon vapors from FCC catalyst particles after the catalytic reactions are completed to the desired extent.

In one embodiment the invention provides a particle stripping unit for separating particles in suspension with a carrier fluid with a self-stripping disengagement feature. The particle stripping unit includes a stripping vessel having a primary cyclone and an inlet to tangentally feed a particulate-fluid suspension to the primary cyclone. The unit has a cylindrical surface within the primary cyclone to separate a major fraction of the particulates from the suspension and form a central fluid vortex of reduced particulate content and includes a particulate discharge outlet into the stripping vessel from the primary cyclone. The stripping unit includes a plurality of openings in a wall of the primary cyclone for entry of stripping fluid into the primary cyclone from a dilute phase in the stripping vessel; and a fluid discharge line from the stripping vessel, in communication with the vortex of the primary cyclone and sealed against direct fluid entry from the dilute phase.

The particle stripping unit can also include a stripping zone between the vortex and the particulate discharge outlet. The openings in the wall for entry of the stripping fluid can be located in the stripping zone. The self-stripping cyclone can include a thermal expansion joint in the fluid discharge line.

The particle stripping unit can include a stabilizer between the vortex and the stripping zone forming an annular passage between the stabilizer and an interior surface of the cyclone for downward passage of particulates and upward passage of fluid. The inlet can be connected to a fluid catalytic cracking (FCC) riser to receive a suspension of solid catalyst particles in the vapor.

The invention can include a method of operating the particle stripping unit. The method can include supplying the suspension to the inlet, passing particulates downwardly through a cross-sectional area of a lower portion of the stripping vessel comprising a vertical cylinder at an average flux rate of from 24 to 440 kg per square meter of cross-sectional area per second (5 to 90 lb/ft2s), introducing stripping fluid into the stripping zone openings at an average fluid velocity of from 9 to 90 meters per second (30 to 300 ft/s), and recovering stripped particles from the particulate discharge outlet. The method can further include a cyclone which can include a stabilizer between the vortex and the stripping zone forming an annular passage between the stabilizer and the interior surface of the cyclone for downward passage of particulates and upward passage of fluid. The method can include passing fluid up through the annular passage at a superficial velocity in a range of 0.1 to 5 meters per second (0.4 to 17 ft/s). The solids flux rate can be from 70 to 200 kg per square meter of cross-sectional area per second (14 to 40 lb/ft2s). The superficial fluid velocity in the annulus can be from 0.5 to 1.5 meters per second (1.7 to 5 ft/s), and the stripping fluid opening velocity can be from 37 to 60 meters per second (120 to 200 ft/s).

In another embodiment the invention provides a method of operating the self-stripping cyclone described above. The method includes: (a) supplying the suspension to the inlet; (b) passing particulates downwardly through a cross-sectional area of a lower portion of the cyclone vessel comprising a vertical cylinder at an average flux rates from 24 to 440 kg per square meter per second (5 to 90 lb/ft2s); (c) introducing stripping fluid into the stripping zone openings at an average fluid velocity of from 9 to 90 meters per second (30 to 300 ft/s); and (d) recovering stripped particles from the particulate discharge outlet. The cyclone can include a stabilizer between the vortex and the stripping zone to form an annular passage between the stabilizer and an interior surface of the cyclone, and the operating method can include passing fluid upwardly through the annular passage at a superficial velocity of from 0.1 to 5 meters per second (0.4 to 17 ft/s). Desirably, the solids flux rate is from 70 to 200 kg per square meter of cross-sectional area per second (14 to 40 lb/ft2s), the annular superficial fluid velocity from 0.5 to 1.5 meters per second (1.7 to 5 ft/s), and the stripping fluid opening velocity from 37 to 60 meters per second (120 to 200 ft/s).

In a further embodiment, the invention provides an FCC unit including an FCC stripper vessel, a self-stripping primary cyclone disposed within the stripper vessel to separate catalyst from the FCC riser effluent and form a catalyst-lean stream of hydrocarbon vapors, and a catalyst stripping bed in a lower end of the FCC stripper. The vessel can include an inlet to the primary cyclone to tangentially supply the FCC riser effluent, a stripping fluid supply to the stripping bed, and a stripped catalyst outlet from the stripping bed through the lower end of the FCC stripper.

In the FCC unit, the primary cyclone can include a cyclone vessel, a cylindrical surface centrally mounted in the primary cyclone to separate solids from the suspension and form a vapor vortex of reduced solids content, a sealed vapor outlet from the primary cyclone in communication with the vortex, a stripping zone between the vortex and a lower end of the primary cyclone, a solids discharge outlet from the stripping zone through the lower end of the primary cyclone, and a plurality of openings in a wall of the stripping zone for the entry of stripping fluid. The cyclone can also include a thermal expansion joint in the vapor outlet. The cyclone can also include a stabilizer below the vortex forming an annular passage between the stabilizer and an interior surface of the primary cyclone.

The FCC unit can also include a secondary cyclone stage comprising at least one secondary cyclone downstream from the primary cyclone, wherein the at least one secondary cyclone can be connected in series with the primary cyclone by a sealed plenum including a thermal expansion joint in communication between a vapor outlet from the primary cyclone to a tangential inlet of the at least one secondary self-stripping cyclone. The FCC unit can have a catalyst regenerator that includes a stripped catalyst inlet to the regenerator connected to the solids discharge outlet of the FCC stripper, a distributor to introduce an oxygen-containing gas into the regenerator to regenerate the stripped catalyst, and an outlet from the regenerator to transfer regenerated catalyst from the regenerator to an inlet of the FCC riser.

In a further embodiment, the invention provides a method of operating the FCC unit. The method can include the steps of: (a) supplying a vapor-solid suspension from an FCC riser to the inlet of the FCC unit described above; (b) passing solids downwardly through a cross-sectional area of a lower portion of the cyclone vessel comprising a vertical cylinder at an average flux rate of from 24 to 440 kg per square meter of cross-sectional area per second (5 to 90 lb/ft2s); (c) passing fluid upward through the cylinder at a superficial velocity of from 0.06 to 3 meters per second (0.2 to 10 ft/s); (d) introducing stripping fluid into the stripping zone wall openings at an average fluid velocity of from 9 to 90 meters per second (30 to 300 ft/s); and (e) recovering stripped particles from the solids discharge outlet. The cyclone vessel can include an annular passage, and the operating method can include passing fluid upwardly through the annular passage at a superficial velocity of from 0.1 to 5 meters per second (0.4 to 17 ft/s). The solids flux rate can be from 70 to 200 kg per square meter of cross-sectional area per second (14 to 40 lb/ft2s), the annular superficial fluid velocity can be from 0.5 to 1.5 meters per second (1.7 to 5 ft/s), and the stripping fluid opening velocity can be from 37 to 60 meters per second (120 to 200 ft/s). The stripping fluid supply can be selected from a source including steam, air, ammonia, a flue gas, or mixtures thereof.

Another embodiment provides a method for stripping vapor from a suspension of particulates in a carrier gas. The method can include: (a) separating particulates from the suspension in an initial separation zone of a cyclone to form a particulate-rich stream with entrained vapor and a vapor stream lean in suspended matter; (b) introducing a stripping fluid through openings in an exterior wall of the cyclone into a stripping zone below the initial separation zone; (c) passing the particulate-rich stream from the separation zone, through the stripping zone in countercurrent contact with the stripping fluid to remove at least a portion of the entrained vapor, and into a dipleg in communication with the stripping zone; and (d) recovering stripped particulates from the dipleg. The stripping zone can be in fluid communication with the initial separation zone via an annular passage defined by an outside diameter of a vortex stabilizer and an interior wall of the cyclone between the separation and stripping zones.

The invention can also include a retrofit embodiment providing a method of retrofitting an existing cyclone to a self-stripping cyclone. This embodiment is applicable to existing cyclones that are housed within a pressurized vessel to receive a vapor-solid suspension and separate the suspension into a solids-rich stream and a solids-lean stream, having a lower discharge to pass the particulates into the pressurized vessel, and are connected to a plenum in communication with an exterior of the pressurized vessel to recover the solids-lean stream. The retrofit can include installing a new cyclone bottom to an upper portion of the existing cyclone to provide a stripping zone in communication with the upper portion. The new cyclone bottom can include a dipleg to receive the solids rich stream from the stripping zone and a plurality of openings in a wall of the bottom to introduce stripping fluid into the stripping zone by differential pressure. When the plenum of the existing cyclone comprises an unsealed joint, the retrofit method can include replacing the unsealed joint with a sealed joint. If desired, the new cyclone bottom can include a vortex stabilizer defining an annular passage with an interior wall of the cyclone bottom.

BRIEF DESCRIPTION OF THE DRAWINGS

FIG. 1 is simplified perspective drawing of a self-stripping cyclone for separating particles from a fluid suspension according to an embodiment of the invention.

FIG. 2 is a cross-sectional view of the cyclone of FIG. 1 as seen along the lines 2-2.

FIG. 3 is a cross-sectional view of the cyclone of FIG. 1 as seen along the lines 3-3.

DETAILED DESCRIPTION

Figure 4:
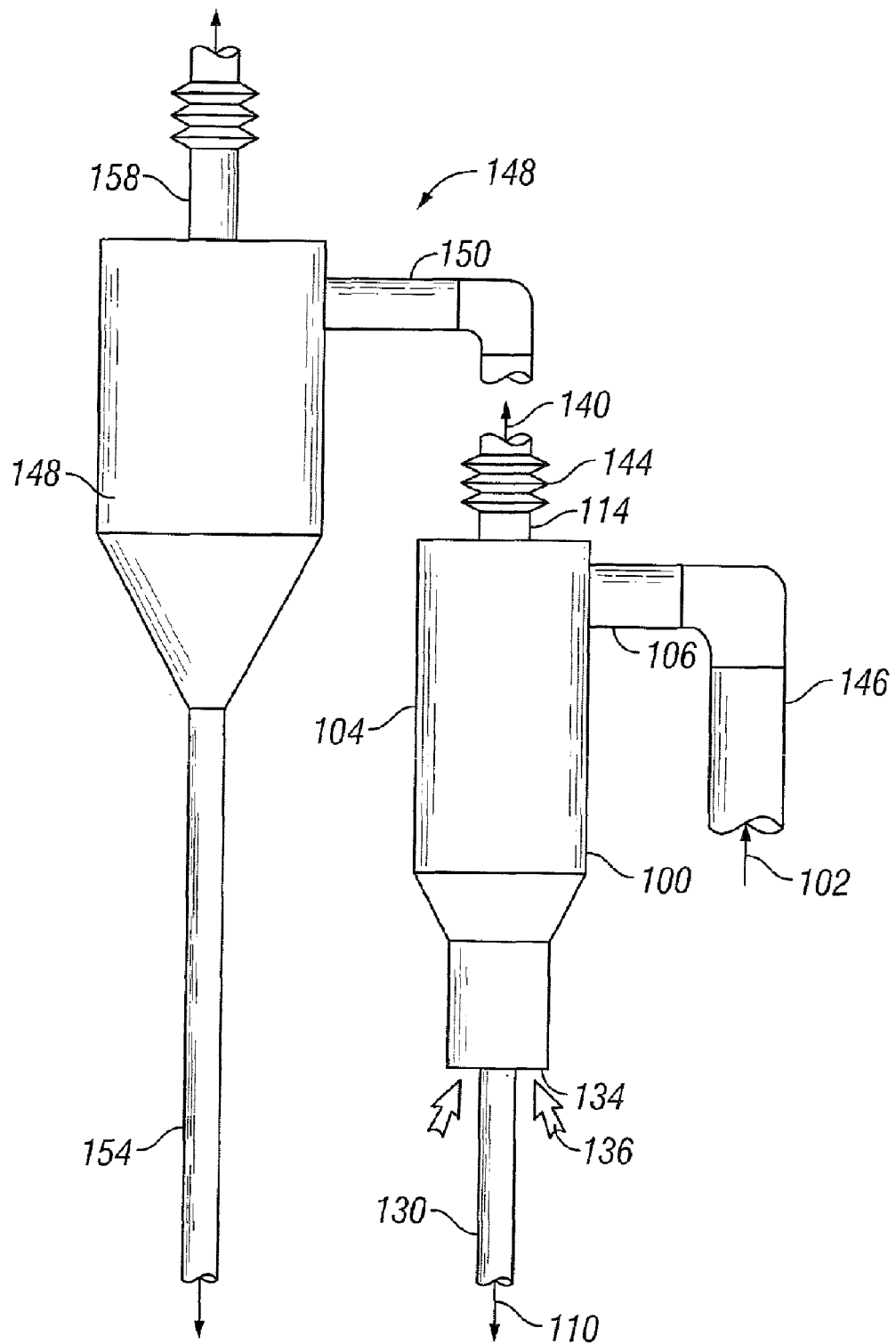
FIG. 4 is a schematic diagram of staged cyclones in series according to an embodiment of the present invention.

Detailed embodiments of the present invention are disclosed herein. However, it is understood that the disclosed embodiments are merely exemplary of the invention, which can be embodied in various forms. Specific structural and functional details disclosed herein are not intended to be limiting, but are merely illustrations that can be modified within the scope of the attached claims.

The present invention can be used in a process requiring particulate disentrainment from carrier fluids in a flowing suspension, particularly in systems with a need to quickly heat or cool the separated particles, or to strip the separated particulates of residually entrained carrier fluids. The present invention can accommodate a variety of different applications involving various fluid and particulate phases, fluid mechanics, separation and stripping rates, and contact times.

With reference to the drawings, wherein like numerals refer to like parts, the embodiment seen in FIGS. 1-3 shows a self-stripping cyclone 100 for separating catalyst particles from hydrocarbon vapor suspension 102 from a fluid catalytic cracking (FCC) riser. The self-stripping cyclone 100 can include a cyclone vessel 104, a tangential inlet 106 connected to the riser (not shown), and an inner cylindrical surface 108 to separate catalyst solids 110 and form a vapor vortex 112 of reduced solids content. A sealed vapor outlet plenum 114 at the upper end 116 of the cyclone vessel 104 can communicate with the vortex 112 via a vortex tube 117. In high-temperature applications such as fluid catalytic cracking, the outlet plenum can typically include a thermal expansion joint 144 to absorb structural strains imposed by thermal expansion of components and piping.

A conventional stabilizer 118 below the vortex 112 can be used to form an annular passage 120 between the stabilizer 118 and an interior surface of the cyclone vessel 104. A stripping zone 126 below the stabilizer 118 in the lower end 128 of the cyclone vessel 104 can be in communication with a solids discharge dipleg 130. A plurality of openings 132 can be provided in a perforated wall 134 of the stripping zone 126 for the entry of stripping gas 136. A lower portion of the stripping zone 126 can comprise a settling bed (not shown) of the catalyst solids 110 into the dipleg 130.

In the operation of the self-stripping cyclone, the fluid/particulate suspension 102 enters the cyclone vessel 104 tangentially and swirls circumferentially against the cylindrical surface of the vessel, forming the vortex 112. Suspended particulates 110 are immediately driven outward towards the wall 108 by centrifugal force as the gas phase of decreasing particulate loading forms the vortex 112. From the vortex 112, the solids-lean vapor 140 can exit via the vortex tube 117 to the plenum 114.

Disentrained particulates 110 rapidly concentrate at the vessel wall and pass downward as indicated by flow arrow 122 through the annular passage 120 and stripping zone 126 and into the dipleg 130. Due to a differential pressure between the exterior and the interior of the cyclone vessel 104, stripping gas 136 enters the stripping zone 126 through the openings 132 in the wall 134 and passes upwardly as indicated by flow arrow 124 through the annular passage 120 into the vortex 112. The process vapor is thus quickly diffused away from the particulates 110 into the stripping gas 136 in the stripping zone 126 and/or annular passage 120. The stripping gas 136 can be air, steam, ammonia, flue gas, or a mixture thereof. In applications other than FCC systems, the stripping fluid can desirably be chosen to be compatible with the particulates to be stripped and the process fluids to be removed from the particulates.

FIG. 4 shows a two-stage embodiment that can include the primary stripping cyclone 100 connected to the tangential inlet 106 to receive effluent 102 from the FCC riser 146, as in FIG. 1, and a secondary cyclone 148 connected at the tangential inlet 150 to the primary cyclone plenum 114 to receive the solids-lean vapor 140 from the primary cyclone 100. The secondary cyclone 148 can include a solids discharge dipleg 154 and a vapor discharge plenum 158. Further cyclone stages can be configured in a like manner for series and/or parallel flow, as is well known in the industry.

Figure 5:
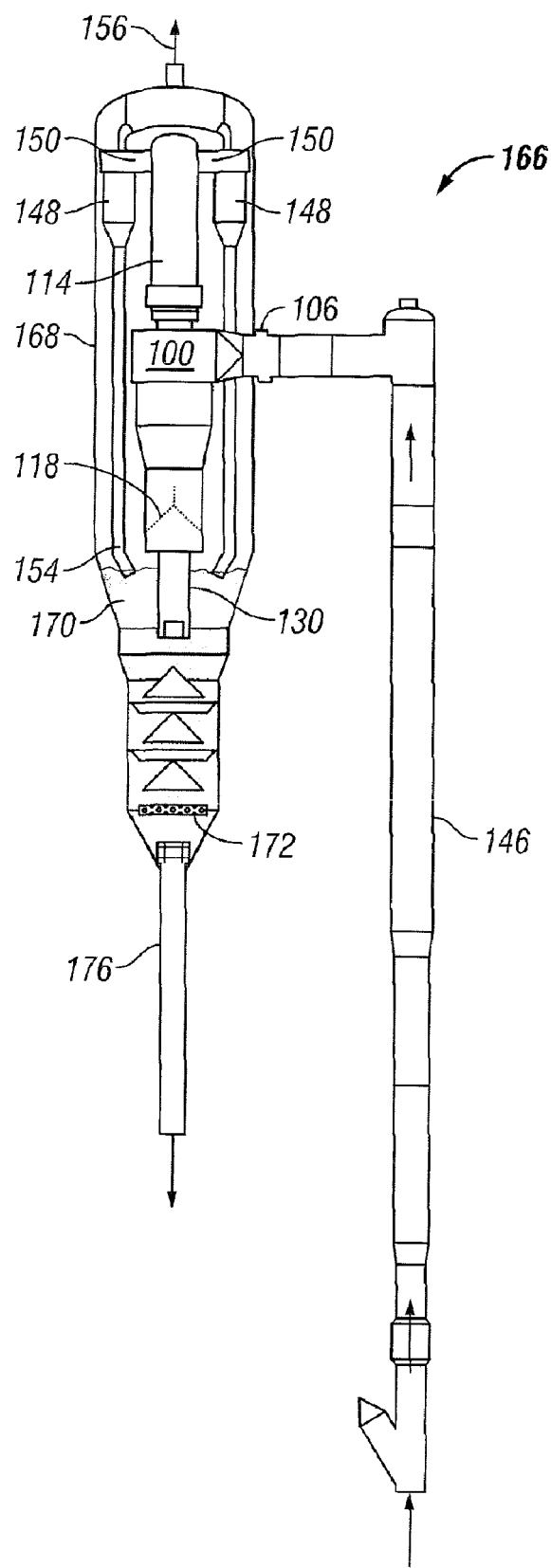
FIG. 5 is a schematic of a self-stripping riser cyclone integrated into a fluid catalytic cracking stripper unit according to an embodiment of the invention.

FIG. 5 shows an embodiment of the invention with a primary self-stripping cyclone integrated in an FCC stripper unit 166. The FCC stripping vessel 168 can house the primary self-stripping cyclone 100 and a plurality of secondary cyclones 148 above a catalyst bed 170. The FCC riser 146 can be connected to the tangential inlet 106 of the primary cyclone 100, and stripping gas can be supplied via a conventional distributor 172 near the bottom of the bed 170 above the stripped catalyst discharge dipleg 176. In this embodiment a sealed discharge plenum 114 from the first-stage cyclone 100 can connect dual tangential inlets 150 to a pair of secondary cyclones 148 configured for parallel flow operation.

In operation, effluent from the FCC riser 146 flows into the cyclones 100, 148. Fresh stripping gas is introduced at the distributor 172, percolating upward through the bed 170 to maintain a pressure in the vessel 168 that is greater than the interior pressures in the cyclones 100, 148. The stripping gas flows through the perforated walls 134 of the cyclone 100 (see FIGS. 1-4) to achieve self-stripping as described above. Disentrained catalyst is initially stripped in the stripping zone and annular passage of the cyclone 100, and then the stripped catalyst is discharged through the dipleg 130 to the bed 170. Additional catalyst disentrained from the secondary cyclones 148 is discharged to the bed 170 via the diplegs 154. The cyclone diplegs 130, 154 can be sealed in the catalyst bed or can regulate catalyst flow with trickle valves (not shown). Stripping is completed to remove residual hydrocarbons from the catalyst in the bed 170. A blend of process vapor and stripping gas lean in suspended solids can be recovered from overhead outlet 156.

Figure 6:
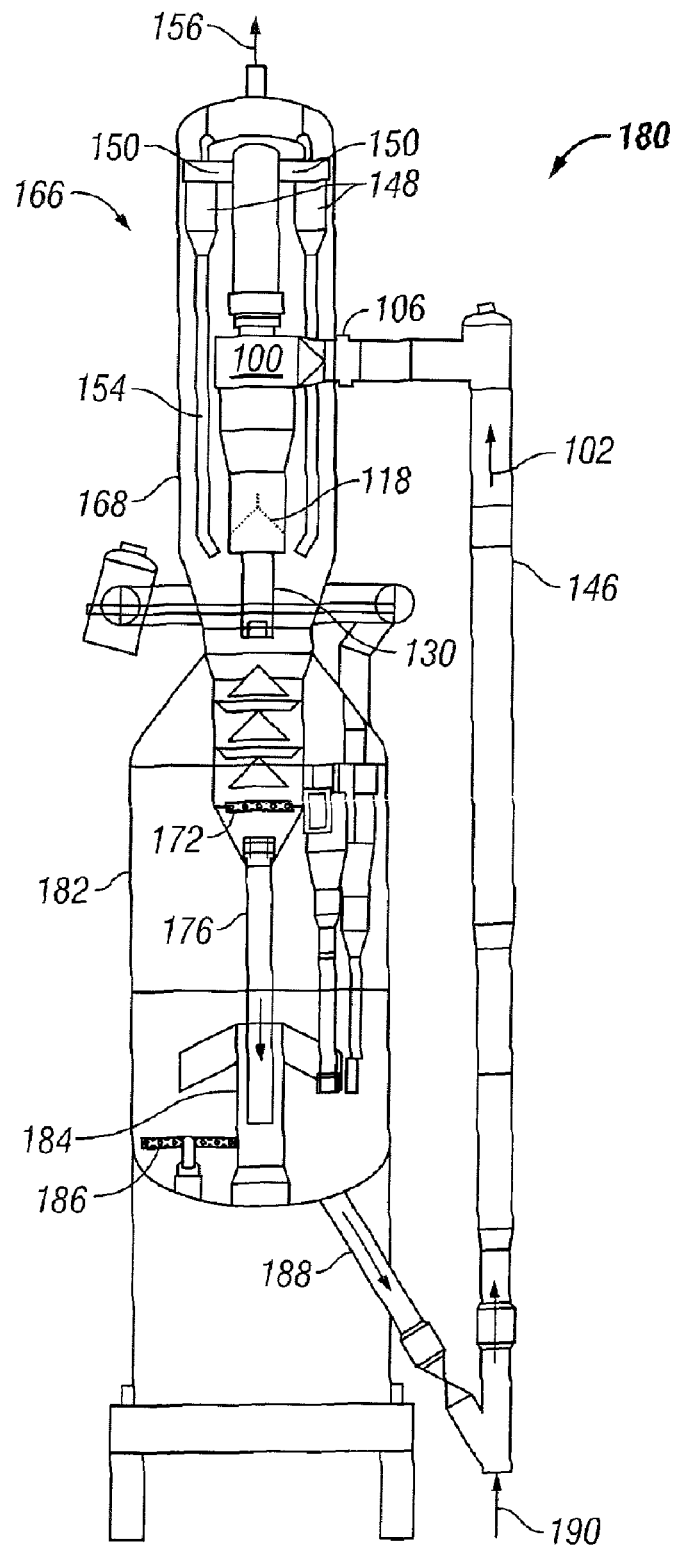
FIG. 6 is a schematic of a self-stripping riser cyclone integrated into a fluid catalytic cracking unit according to another embodiment of the invention.

FIG. 6 shows an embodiment of an FCC unit 180, wherein the stripper unit 166 of FIG. 5 can be positioned directly over a conventional regenerator 182. Stripped catalyst can enter the regenerator 182 via the dipleg 176 and the conventional standpipe 184. An oxygen-containing gas can be introduced via the distributor 186, and the off-gas can be removed in a manner well known in the industry. Regenerated catalyst can be recirculated to the riser 146 via the transfer line 188 along with a fresh feed stream 190. Diplegs 130, 154 can be sealed in the catalyst bed or alternatively can include with trickle valves (not shown).

Figure 7:
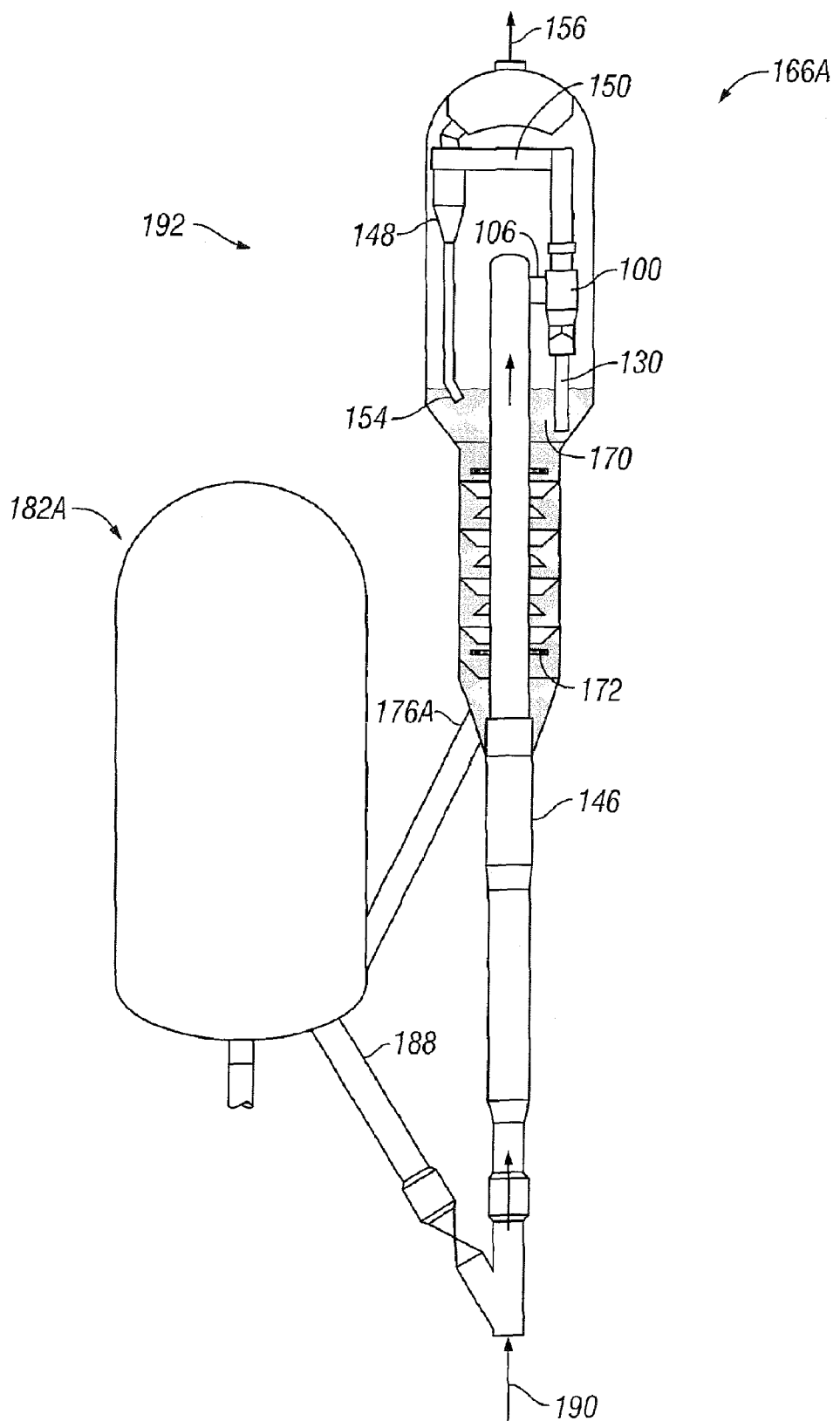
FIG. 7 is a schematic of a self-stripping riser cyclone integrated into a fluid catalytic cracking unit according to a further embodiment of the invention.

FIG. 7 shows an alternate embodiment of an FCC unit 192 wherein the regenerator 182A can be offset from the stripper unit 166A, and the stripper unit can be positioned vertically over the riser 146, with the riser 146 passing through the stripping bed 170 of unit 166A. The stripped catalyst can be supplied to the regenerator 182A via the transfer line 176A. The FCC unit 192 can be otherwise similar to the unit 180 shown in FIG. 6. Additionally, diplegs 130, 154 can be sealed in the catalyst bed, or alternatively can include trickle valves (not shown).

Figure 8:
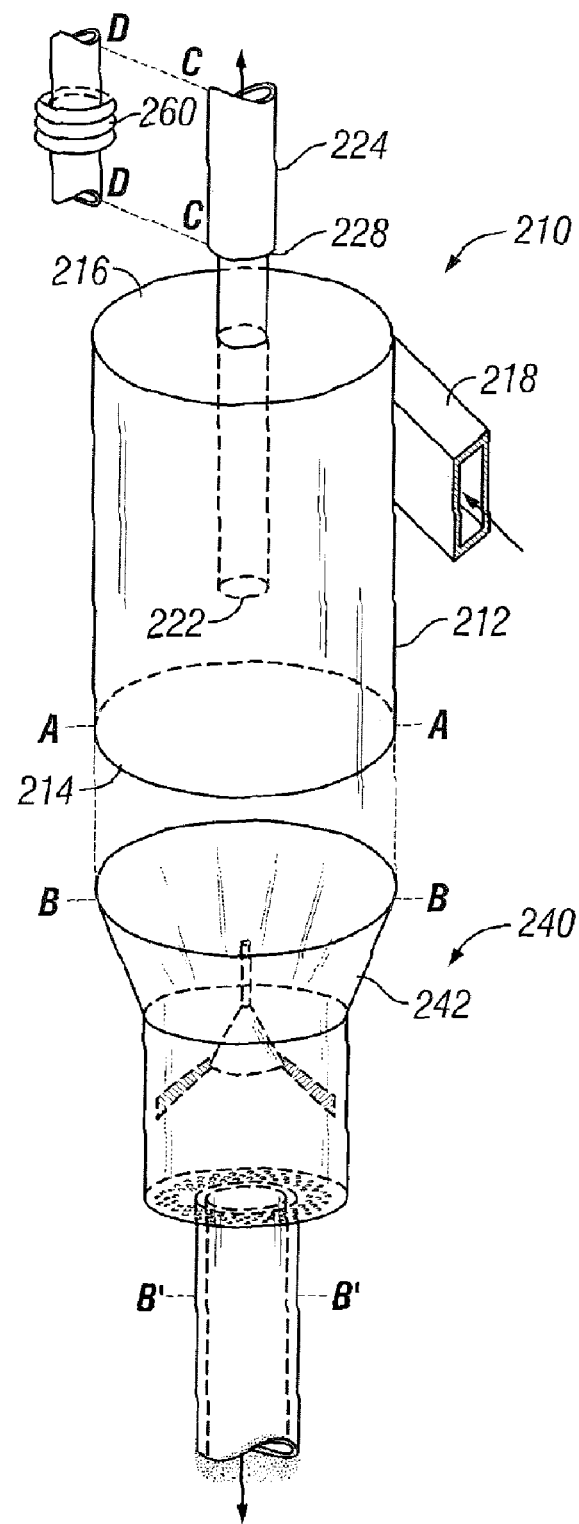
FIG. 8 is a simplified perspective drawing of an existing open cyclone being modified to a self-stripping cyclone according to an embodiment of the invention.

The present invention can be used in a new facility, or it can be implemented as a retrofit in an existing cyclone separator. FIG. 8 shows the conversion of an existing FCC stripper primary cyclone 210 having an open cyclone design housed within an FCC stripping vessel (not shown). The open cyclone 210 can have a cylindrical wall 212 with an open bottom end 214 and a closed top 216. The existing cyclone can have a tangential inlet 218, vortex tube 222, and discharge plenum 224. The disentrained catalyst can fall through the open bottom directly into the catalyst bed in the stripper vessel 240. The cyclone 210 can be equipped with an unsealed junction 228 to allow for entry of the stripping gas and to allow for differential thermal expansion of the plenum 224.

To retrofit the existing cyclone 210, an add-on lower cyclone body portion 240, as shown in a lower half of FIG. 8, can be attached to the bottom 214 of the cyclone 210 by welding the lower ends A-A of cyclone 210 and the upper end B-B of add-on 240 together. If necessary, the existing wall 212 can be cut at the appropriate height to accommodate the add-on cyclone bottom 240. The dipleg (not shown) can extend an appropriate length into the catalyst stripping bed, which may be higher or lower than the catalyst bed in the operation of the pre-existing cyclone 210. Similarly, the unsealed junction 228 can be cut out at the lines C-C and replaced with a new thermal expansion joint 260 that can be welded at the lines D-D. The new thermal expansion joint 260 can be sealed to prevent fluid entry or exit along the plenum 224.

Figure 9:
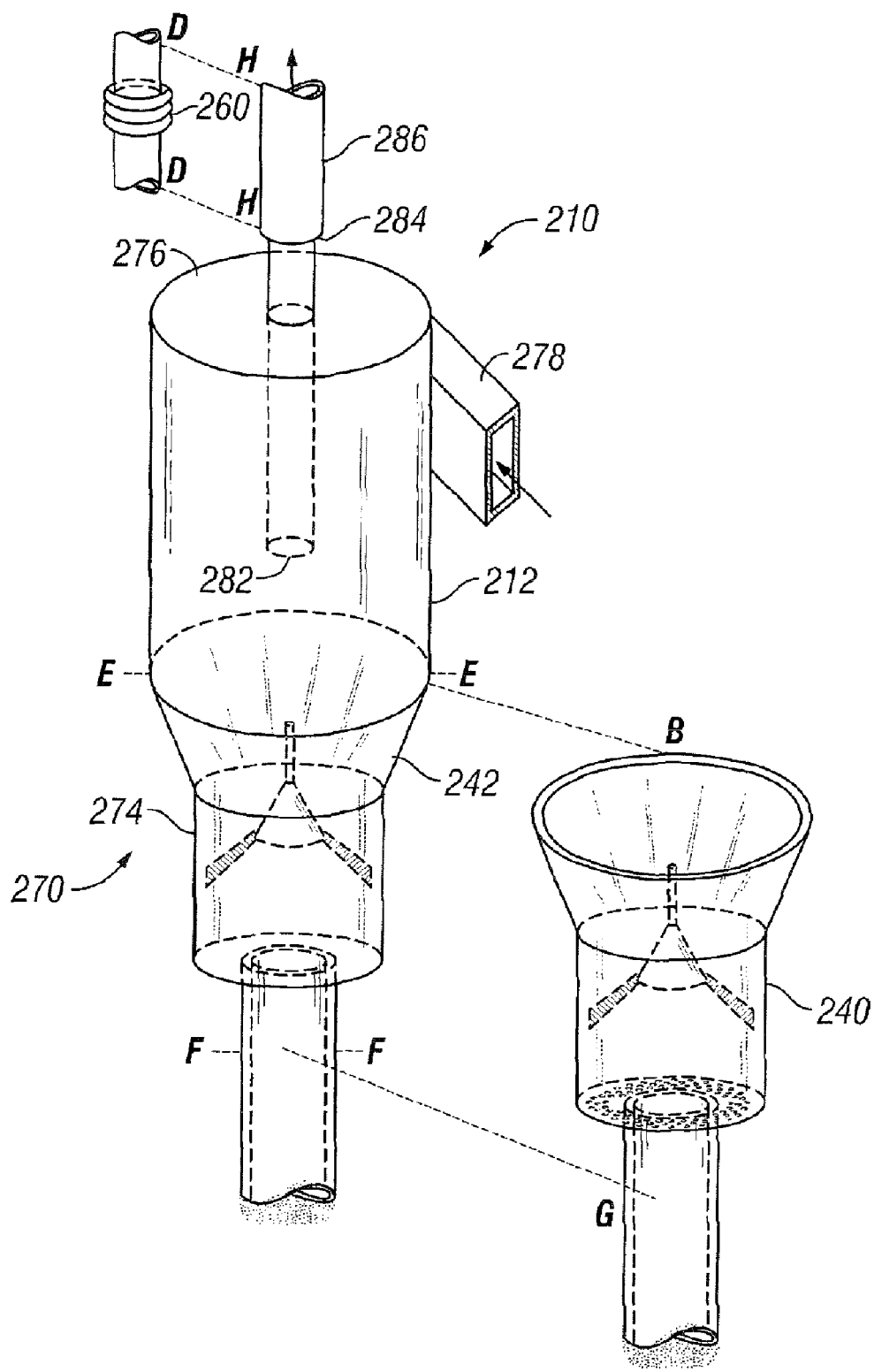
FIG. 9 is a simplified perspective drawing of an existing closed cyclone being modified to a self-stripping cyclone according to another embodiment of the invention.

FIG. 9 illustrates the retrofit of an existing closed cyclone 270 having a cyclone vessel 212, closed bottom section 274, closed top 276, tangential inlet 278, vortex tube 282, and unsealed, annular junction 284 connected to the plenum 286. The existing bottom section 274 can be modified by providing perforations (not shown) as needed in one or more walls. Desirably, the bottom section 274 can be cut at E-E and replaced with the new bottom section 240 as described in reference to FIG. 8. The junction 284 can be replaced by removing the plenum 286 defined by lines H-H and installing the expansion joint 260 at D-D. The modified cyclone can receive the stripping gas through the new bottom section 240. If necessary, a replacement vortex tube 282 can also be installed to accommodate the additional flow volume from the stripping gas.

In the various configurations and applications of the embodiments described above, a stripping gas can flow through perforations in a lower end of the self-stripping cyclone, as shown for example, in FIG. 1 as 132. At steady-state conditions, pressure in the stripping vessel housing the self-stripping cyclone will be higher than the pressure inside the cyclone. The stripping vessel can provide a source of lean stripping gas, and the lower pressure in the cyclone can draw the stripping gas into the cyclone. In FCC applications, the self-stripping cyclone can be operated with downward passage of disentrained particulates in the primary self-stripping cyclone vessel at an average flux from 24 to 440 kg/m2s (5 to 90 lbm/ft2s), desirably from 50 to 290 kg/m2s (10 to 60 lbm/ft2s), and even more desirably from 70 to 200 kg/m2s (14 to 40 lbm/ft2s). The stripping gas and recovered process fluid can flow up through an annular passage into the vortex zone at superficial gas velocities from 0.1 to 5 m/s (0.4 to 17 ft/s), desirably from 0.2 to 2 m/s (0.7 to 7 ft/s), and even more desirably in the range of 0.5 to 1.5 m/s (1.7 to 5 ft/s). The perforations in the lower cyclone wall can be uniformly sized to provide an average stripping gas velocity through the openings of between 9 and 90 m/s (30 and 300 ft/s), more desirably between 27 and 73 m/s (90 and 240 ft/s), and even more desirably between 37 and 60 m/s (120 and 200 ft/s).

Cold Flow Modeling

Figure 10:
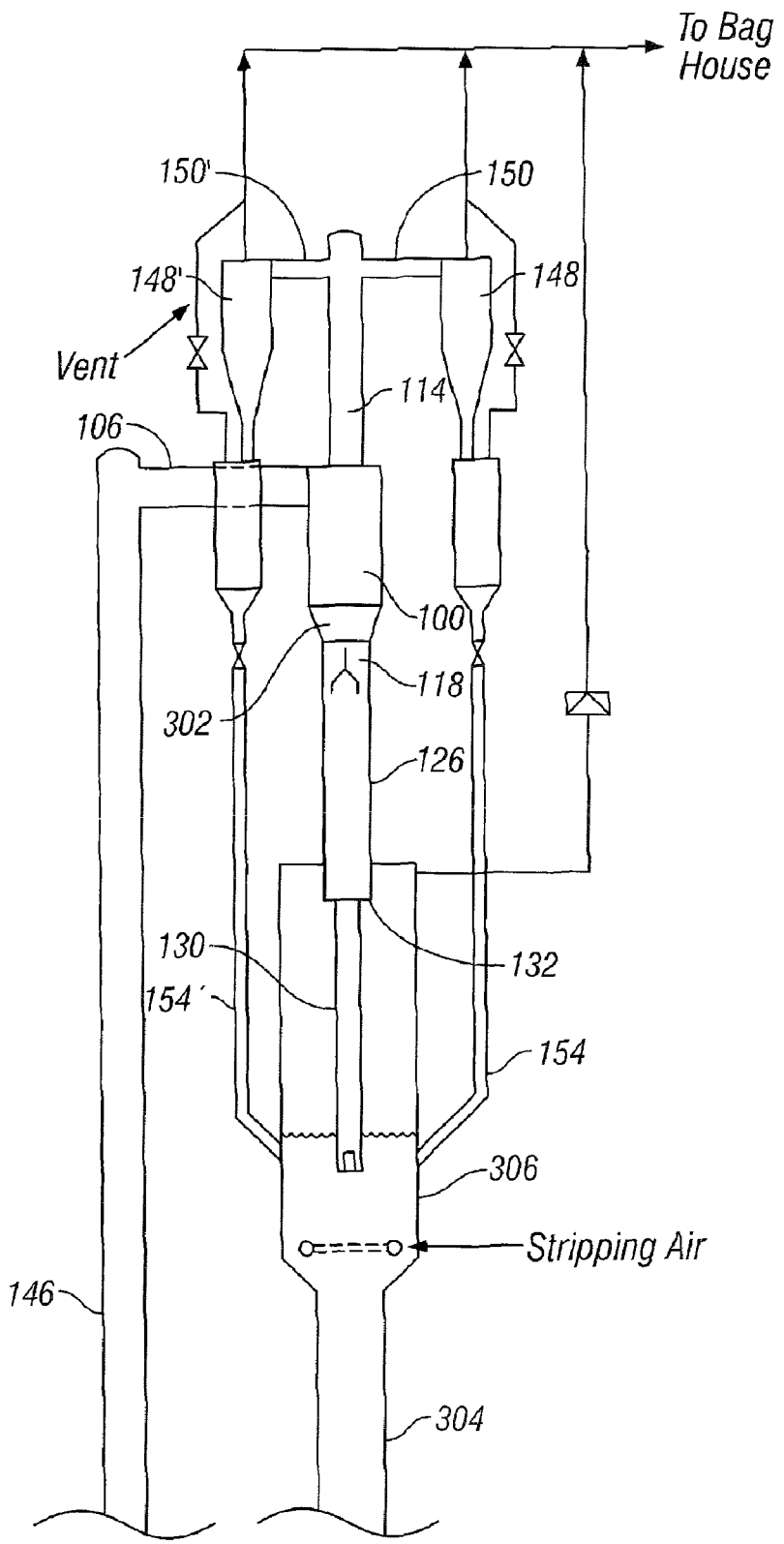
FIG. 10 is a simplified cross-sectional view of the experimental self-stripping cyclone featuring a 20.3 cm (8 in.) stripping section.
Figure 11:
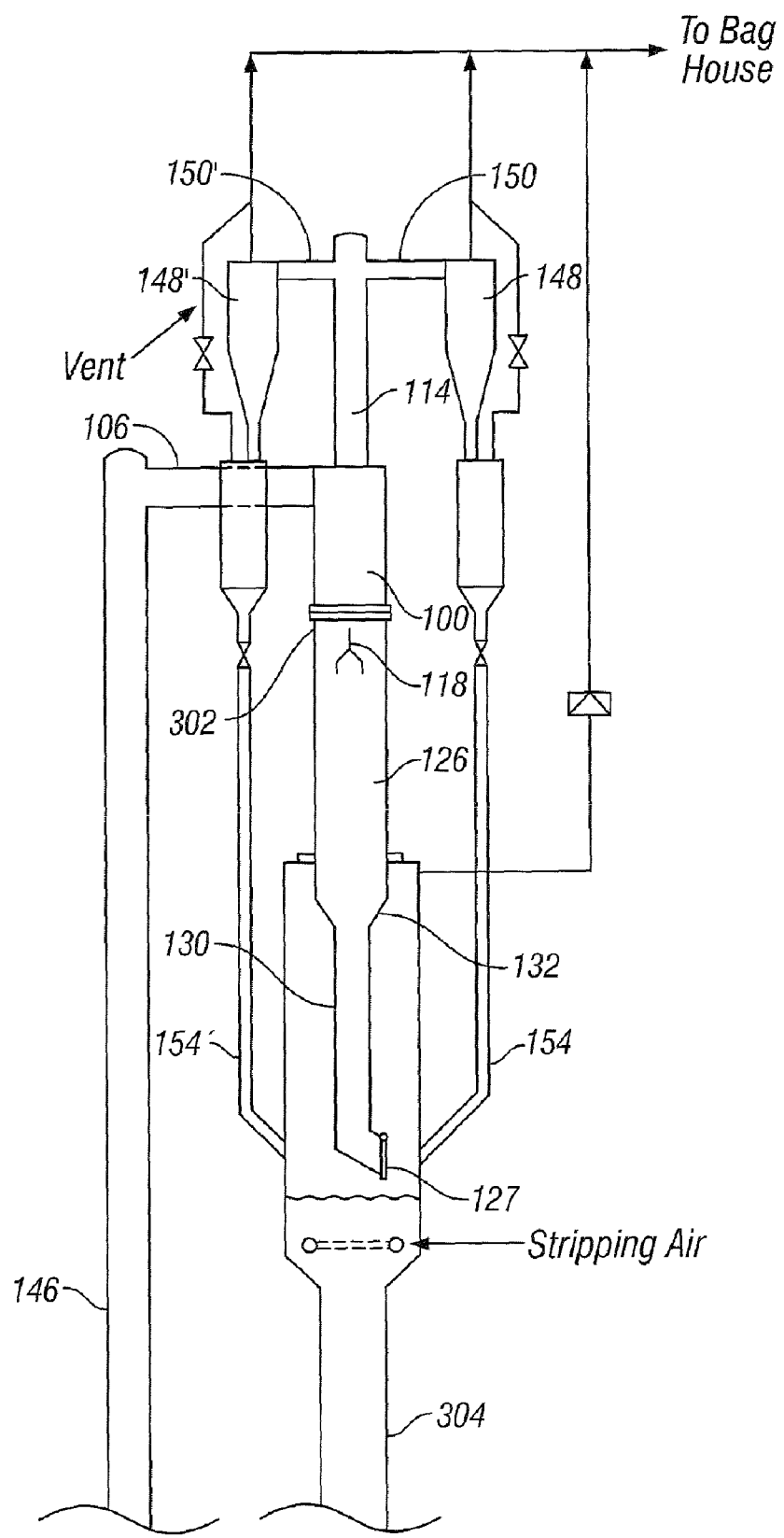
FIG. 11 is a simplified cross-sectional view of the experimental self-stripping cyclone featuring a 30.5 cm (12 in.) stripping section.

Both stripping efficiency and separation efficiency of the self-stripping cyclone were tested via cold flow modeling. Two different self-stripping cyclone units were utilized for experimental purposes. As shown in FIGS. 10 and 11, each experimental cyclone had separation sections with 30.5 cm (12 in.) upper barrels. The first test unit, shown in FIG. 10, had a 20.3 cm (8 in.) stripping section 126 with a conical transition 302 between the 30.5 cm (12 in.) separation section 100 and the 20.3 cm (8 in.) stripping section 126. The first test unit had a 10.2 cm (4 in.) dipleg wherein the outlet was submerged below the solids level.

The second testing unit, shown in FIG. 11, had a 30.5 cm (12 in.) stripping section and a 30.5 cm (12 in.) separation section, without any conical transition. In addition, the unit included a 15.2 cm (6 in.) unsealed dipleg with a trickle valve 127, and an outlet located above the solids level.

The diplegs of the first and second testing units emptied into a 61 cm (24 in.) stripper vessel, which was connected to a 30.5 cm (12 in.) stand pipe. Dimensions for the two experimental testing units are given in Table 1. A list of the physical and operational differences between the experimental cyclones is given in Table 2.

TABLE 1

Dimensions of Experimental Self-Stripping Cyclone Units

| Cyclone configuration | FIG. 10 | FIG. 11 |
|---|---|---|
| Riser pipe (146) | 15.2 cm (6 in.) | 15.2 cm (6 in.) |
| Cyclone, separation section (100) | 30.5 cm (12 in.) | 30.5 cm (12 in.) |
| Cyclone stripping section (126) | 20.3 cm (8 in.) | 30.5 cm (12 in.) |
| Primary cyclone dipleg (130) | 10.2 cm (4 in.) | 15.2 cm (6 in.) |
| Standpipe (304) | 30.5 cm (12 in.) | 30.5 cm (12 in.) |
| Stripping vessel (306) | 61 cm (24 in.) | 61 cm (24 in.) |

TABLE 2

Differences in Self-Stripping Cyclone Configurations

| FIG. 10 Configuration | FIG. 11 Configuration |
|---|---|
| Transition cone between the 30.5 cm (12 in.) cyclone barrel and the 20.3 cm (8 in.) stripping section | Cyclone barrel and stripping section have the same diameter |
| Flat transition from bottom of stripping section to dipleg | Conical transition from bottom of stripping section to dipleg |
| Stripping grid holes located in horizontal transition | Stripping grid holes located in conical transition |
| Dipleg diameter is 10.2 cm (4 in.) without a trickle valve | Dipleg diameter is 15.2 cm (6 in.) with trickle valve 127 |
| Dipleg submerged in operation | Dipleg not submerged |
| Vortex stabilizer located below transition cone | Vortex stabilizer located at flange below cyclone barrel |

The experimental equipment consisted of a primary self-stripping cyclone 100, a stripping vessel 126, two secondary cyclones 150, a riser 146, a lateral transition 106, standpipes 304, a bag house, a dry air source, FCC catalyst reserves and a supply of tracer gas (such as, for example, helium or carbon dioxide). Instrumentation for monitoring flow and pressure were used in conjunction with an analyzer for measurement of tracer gas concentrations.

During testing, catalyst was cycled through the system in a closed loop. The catalyst was stored in a bottom hopper of a bag house, and upon initiation, was introduced into the system through an eductor attached to the bottom of the hopper. Air was used for eduction and fluidization of the catalyst in the adjoining lateral section and riser. To evaluate the stripping efficiency of the primary self-stripping cyclone, a tracer gas was injected (as a step change) into the air/catalyst mixture before entering the cyclone. A tracer gas preferentially adsorbed by the FCC catalyst was selected. Upon exiting the riser 146, fluidized catalyst entered the primary self-stripping cyclone 100 where the initial gas-solid separation was performed. The separated gas, lean in solid particles, exited through the overhead line 114 in the cyclone 100. A T-junction in the overhead line split the flow into equal volumes for further separation in the secondary cyclones 150.

The remaining solids in the primary self-stripping cyclone were supplied to the stripping section 126 of the cyclone 100. A stripping medium was introduced into the cyclone through a series of orifices in the transition 132 to the dipleg 130, and used to remove the adsorbed gas from the catalyst particles. After the catalyst was stripped, it underwent further stripping in the stripper, was fluidized, and returned to the test loop at the lateral transition section. Gas supplied to the secondary cyclones 150 was further separated as the remaining gas-lean solids were removed and supplied to the stripping vessel 306 via the secondary cyclone dipleg 154. The solids-lean gas from the secondary cyclones exited the top of the cyclone and was sent to the bag house. Any remaining particulates were removed from the gas in the bag house and vented.

To determine stripping efficiency of the primary self-stripping cyclone, three independent variables were identified and tested: cyclone inlet velocity, catalyst circulation rate and stripping section upward velocity. For each variable, a range of data points were selected to provide a representative model of the effect of each variable on the dependent variables. Measurement of cyclone separation efficiency was based on a mass balance of the FCC catalyst, and cyclone stripping efficiency on a mass balance of the tracer gas.

During testing, the following experimental conditions were employed with respect to independent variables described above. Catalyst circulation rates were maintained at 318 kg/min (700 lb/min), 250 kg/min (550 lb/min), or 136 kg/min (300 lb/min). Cyclone inlet velocity was maintained at 12.2 m/s (40 ft/s), 10.7 m/s (35 ft/s), or 8.5 m/s (28 ft/s). Stripper upward velocity was maintained at 0.2 m/s (0.7 ft/s), 0.18 m/s (0.6 ft/s), 0.15 m/s (0.5 ft/s), 0.12 m/s (0.4 ft/s), or 0.09 m/s (0.3 ft/s).

Figure 12:
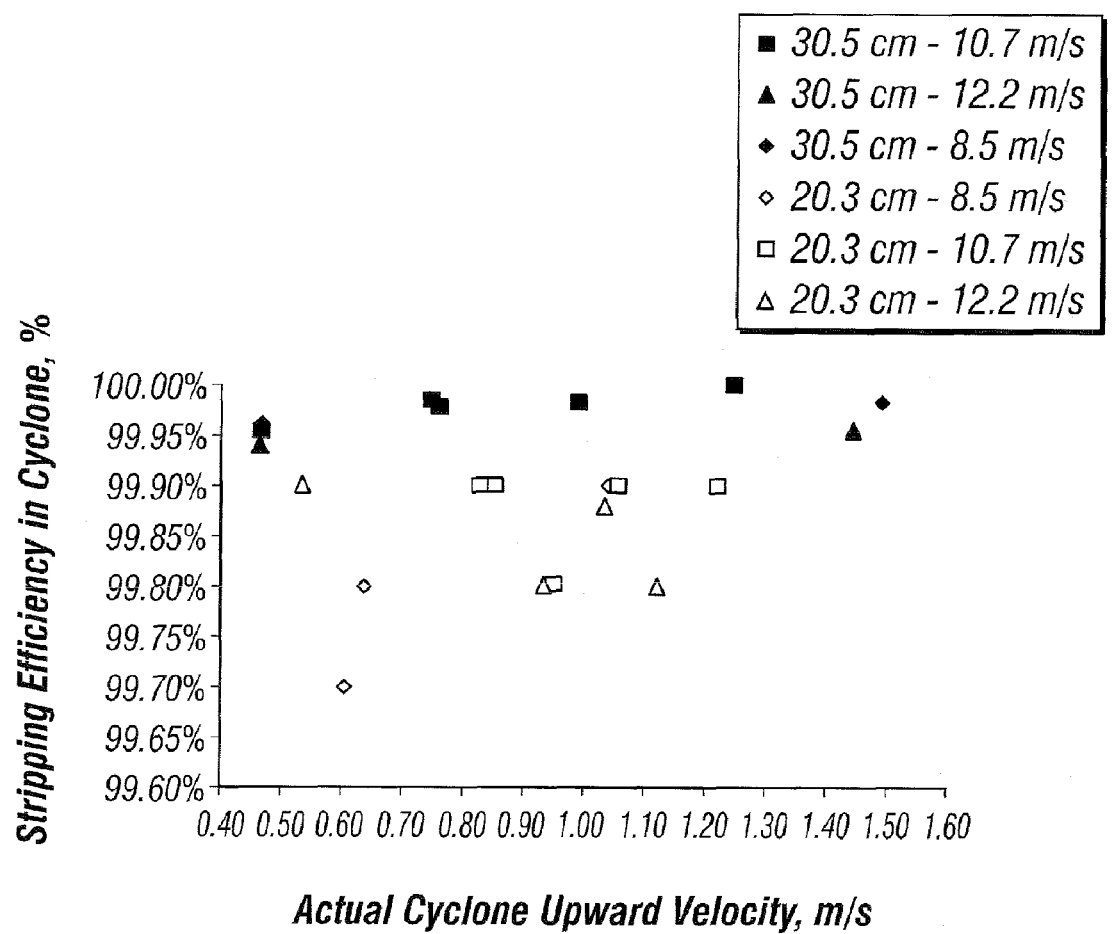
FIG. 12 is a graph showing the effect of upward cyclone stripping steam velocity on stripping efficiency.
Figure 13:
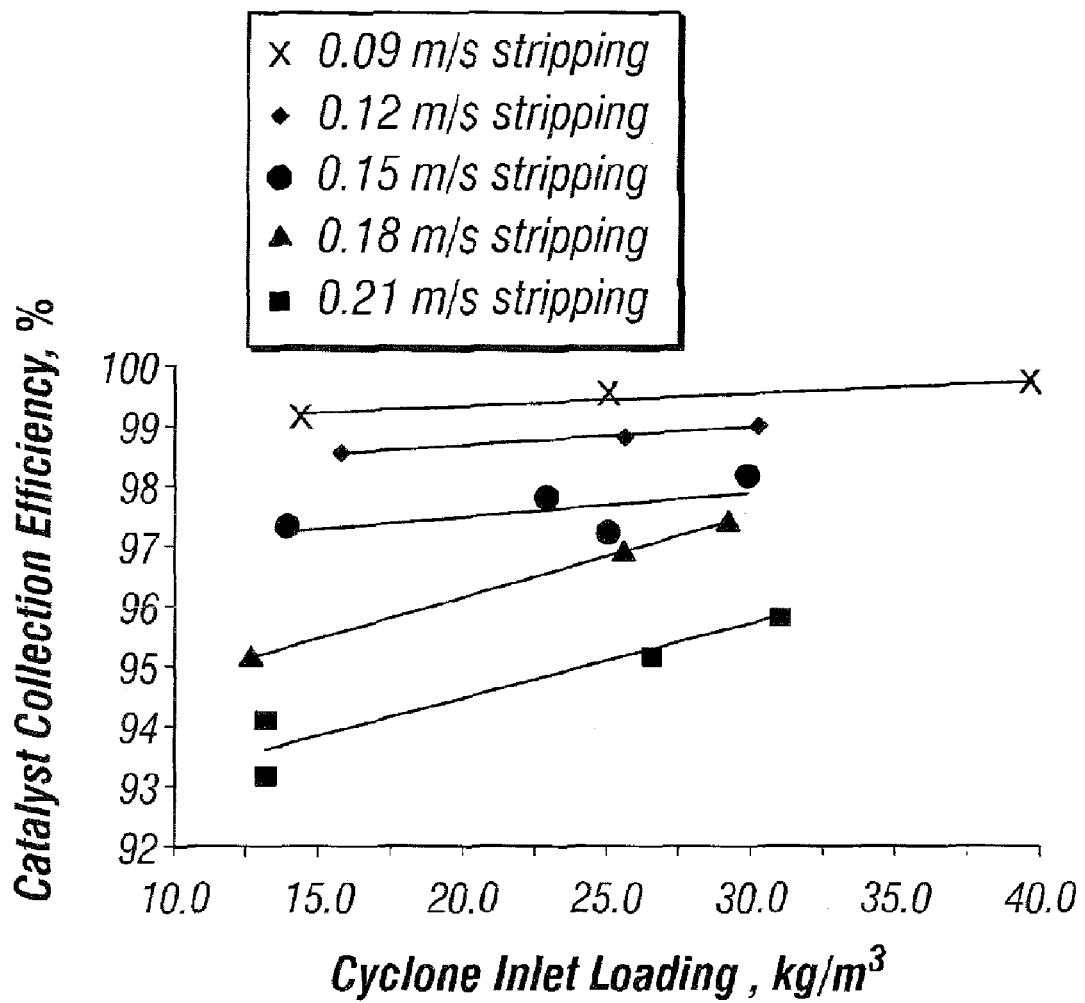
FIG. 13 is a graph showing the effect of inlet loading on cyclone catalyst collection efficiency.

Results demonstrated that the primary self-stripping cyclone had high stripping efficiency, while the addition of the stripping functionality to the cyclone had a minimal negative effect on separation efficiency. FIG. 12 shows that stripping efficiencies of greater than 99.5% were achieved, including at low stripping steam velocities in the cyclone, i.e. 8.5 m/s (28 ft/s). Additionally, FIG. 13 shows that separation efficiencies of greater than 93% were achieved for the primary self-stripping cyclone. Separation efficiency was greatest at low inlet velocity where greater than 99% separation was achieved.

The invention is described above with reference to non-limiting examples provided for illustrative purposes only. The metes and bounds of the invention are not to be limited by the foregoing disclosure, which is illustrative only, but should be determined in accordance with the full scope and spirit of the appended claims. Various modifications and changes will become apparent to the skilled artisan in view thereof. It is intended that all such changes and modifications are within the scope and spirit of the appended claims and shall be embraced thereby.

What is claimed is:

1. A particulate stripping unit with a self-stripping disengagement feature for separating particulates from a carrier fluid, comprising:
   a vessel having a cyclone section and a stripping section, the stripping section having a cross sectional area less than a cross-sectional area of the cyclone section;
   an inlet to tangentially feed a particulate-fluid suspension to the cyclone section;
   a cylindrical surface within the cyclone section to separate a major fraction of the particulates from the suspension and form a vortex of reduced particulate content;
   a particulate discharge outlet from the cyclone section to the stripping section;
   a plurality of apertures disposed through a lower portion of the stripping section; and
   a discharge line from the cyclone section in communication with the vortex.

2. The particulate stripping unit of claim 1, further comprising a thermal expansion joint disposed on the discharge line from the cyclone section.

3. The particulate stripping unit of claim 1, further comprising a stabilizer disposed between the vortex and the stripping section, the stabilizer comprising one or more annular passages disposed therethrough.

4. The particulate stripping unit of claim 1, wherein the inlet is connected to a fluidized catalytic cracking (FCC) riser.

5. A method for stripping vapor from a suspension of particulates in a carrier gas, comprising:
  separating particulates from the suspension in a separation zone having a first cross-sectional area to form a particulate-rich stream with entrained vapor and a vapor stream lean in suspended matter;
  introducing a stripping fluid through a plurality of unobstructed openings formed through a lower exterior wall of a stripping zone disposed below the separation zone, the stripping zone having a second cross-sectional area less than the first cross-sectional area of the separation zone;
  passing the particulate-rich stream from the separation zone through the stripping zone, making countercurrent contact with the stripping fluid to remove at least a portion of the entrained vapor, and into a dipleg in communication with the stripping zone; and
  recovering stripped particulates from the dipleg.

6. The method of claim 5 wherein the stripping zone is in fluid communication with the separation zone via an annular passage defined by an outside diameter of a stabilizer and an interior wall of the-stripping zone.

7. A method for retrofitting an existing cyclone to a self-stripping cyclone, wherein the existing cyclone is housed within a pressurized vessel to receive a vapor-solid suspension and separate the suspension into a solids-rich stream and a solids-lean stream, the existing cyclone has a sealed lower discharge to pass the particulates into the pressurized vessel, and the existing cyclone is connected to a plenum in communication with an exterior of the pressurized vessel to recover the solids-lean stream, the method comprising:
  installing a new section beneath the existing cyclone to provide a stripping zone in communication with the existing cyclone, wherein the new section has a cross-sectional area less than a cross-sectional area of the existing cyclone and a plurality of unobstructed openings formed through a lower portion of the stripping zone to introduce a stripping fluid into the stripping zone; and
  replacing the unsealed joint with a sealed joint, if the plenum of the existing cyclone comprises an unsealed joint.

8. The method of claim 7, wherein the new section comprises a vortex stabilizer wherein the vortex stabilizer and an interior wall of the cyclone define an annular passage therebetween.

9. An apparatus for separating particulates from a carrier fluid, comprising:
  an upper section with a first cross-sectional area;
  a lower section with a second cross-sectional area, wherein the second cross-sectional area is less than the first cross-sectional area;
  a conical member disposed within the lower section and mounted coaxially along a longitudinal centerline of the lower section thereby forming one or more passages therebetween;
  a tangential inlet adapted to feed a particulate-fluid suspension to the upper section wherein at least a portion of the upper section has a cylindrical surface to separate a major fraction of the particulates from the suspension and form a vortex of reduced particulate content; and
  the lower section comprising a lower surface having a plurality of unobstructed openings formed therethrough.

10. The apparatus of claim 9 wherein a tapered transition section is disposed between the upper section and the lower section.

11. The apparatus of claim 9 wherein the conical member comprises an apex disposed toward the upper section and a base defining one or more passages with an inner wall of the lower section.

12. A method for stripping particulates from a particulate-fluid suspension comprising:
  introducing a particulate-fluid suspension to a vessel comprising:
    an upper section with a first cross-sectional area;
    a lower section with a second cross-sectional area, wherein the second cross-sectional area is less than the first cross-sectional area;
    a conical member disposed within the lower section and mounted coaxially along a longitudinal centerline of the lower section thereby forming one or more passages therebetween;
    a tangential inlet to feed a particulate-fluid suspension to the upper section wherein at least a portion of the upper section has a cylindrical surface to separate a major fraction of the particulates from the suspension and form a vortex of reduced particulate content; and
    the lower section comprising a lower surface having a plurality of unobstructed openings formed therethrough;
  separating particulates from the particulate-fluid suspension using the cylindrical surface within the upper section thereby forming a vortex of reduced particulate content;
  settling the separated particulates into the lower section; and
  introducing a fluid, through the plurality of unobstructed openings in the lower surface of the lower section.

13. The method of claim 12, wherein a solids flux rate in the lower section is about 24 kilograms per square meter to about 440 kilograms per square meter of stripping section cross-sectional area per second.

14. The method of claim 12, wherein a superficial velocity of the fluid passing through the lower section is about 0.1 to about 5.0 meters per second.

15. The method of claim 12, wherein a velocity of the stripping fluid through the plurality of openings is about 9 to about 90 meters per second.

16. The method of claim 12, wherein the particulate-fluid suspension is a fluidized catalytic cracker riser stream containing hydrocarbon gas and particulates.

\* \* \* \* \*